United States Patent [19]
Chang et al.

[11] Patent Number: 6,016,142
[45] Date of Patent: Jan. 18, 2000

[54] RICH CHARACTER SET ENTRY FROM A SMALL NUMERIC KEYPAD

[75] Inventors: Shun-Hwa Chang, Fremont, Calif.; Joseph V. R. Paiva, Shawnee, Kans.; Alan Henry Withington, Christchurch, New Zealand

[73] Assignee: Trimble Navigation Limited, Sunnyvale, Calif.

[21] Appl. No.: 09/020,625

[22] Filed: Feb. 9, 1998

[51] Int. Cl.[7] ............................................. G06F 3/023
[52] U.S. Cl. ........................ 345/334; 345/354; 345/168
[58] Field of Search ................................. 345/334, 339, 345/348, 349, 352, 353, 354, 146, 156, 168, 171, 172, 173; 400/485, 486; 708/145, 131, 142; 341/22, 23

[56] References Cited

U.S. PATENT DOCUMENTS

| | | | |
|---|---|---|---|
| 4,567,567 | 1/1986 | Lapeyre | 708/146 |
| 4,709,387 | 11/1987 | Masuda | 379/354 |
| 4,891,777 | 1/1990 | Lapeyre | 708/130 |
| 4,910,697 | 3/1990 | Lapeyre | 708/146 |
| 5,003,503 | 3/1991 | Lapeyre | 708/172 |
| 5,006,001 | 4/1991 | Vulcano | 400/486 |
| 5,062,070 | 10/1991 | Lapeyre | 708/146 |
| 5,128,672 | 7/1992 | Kaehler | 341/23 |
| 5,184,315 | 2/1993 | Lapeyre | 708/146 |
| 5,500,643 | 3/1996 | Grant | 341/22 |
| 5,543,818 | 8/1996 | Scott | 345/168 |
| 5,717,425 | 2/1998 | Sasaki | 345/157 |

*Primary Examiner*—Crescelle N. dela Torre
*Attorney, Agent, or Firm*—Thomas E. Schatzel; Law Offices of Thomas E. Schatzel, A Prof. Corp.

[57] ABSTRACT

A processor is connected to a display screen to generate a screen display of individual characters in groups together with the selector indication. Such characters typically belong in a language set, e.g., English, Japanese, Greek, etc. The processor receives from the numeric keypad a user selection of a number "1–9" that is associated with a particular one of the individual characters in a group highlighted by the selector indication. An index-and-fetch mechanism, typically implemented as a computer program sub-routine, provides for an indexed fetch of a digital data representation in a font memory of a character indexed according to the number "1–9". The fetched digital data is then available for more general use by a larger computer system, for example in the form of an "ASCII" output character.

2 Claims, 2 Drawing Sheets

RICH CHARACTER SET ENTRY FROM A SMALL NUMERIC KEYPAD

BACKGROUND OF THE INVENTION

1. Field of the Invention

The invention relates generally to computer equipment and more particularly to devices and methods for entering full character sets of English, Greek, Chinese, Japanese and others with a numeric keypad common to telephones, calculators, etc.

2. Description of the Prior Art

When both the space and cost of a full alphanumeric keyboard can be accommodated in a computer system or instrument, each key can be dedicated to a particular character. Standard personal computer keyboards for English therefore feature individual keys for numbers 0–9, letters A–Z and a–z, punctuation and arithmetic operators. Keyboards provided for Japanese, for example, would be completely unwieldy because Japanese writing requires the use of Romanji (English Roman characters), Hiragana (Japanese phonetics), Katakana (foreign words in the Japanese phonetic set), and Kanji (fifth-century Chinese). Each of the Romanji, Hiragana and Katakana average twenty-six discrete characters, but even a simple set of Kanji characters can run into the thousands. So some computer systems permit entry of Japanese phonetics using Romanji, e.g., "m-a", "m-i", "m-u", "m-e", "m-o", etc. The user can then choose the Hiragana, Katakana, or Kanji sound-alike, e.g., "ま", "み", "む", "め", "も", for Hiragana; and "マ", "ミ", "ム", "メ", "モ", for Katakana, respectively. The Kanji has several Chinese characters for each sound, all with very different meanings, so a list of the synonyms is usually presented on the screen for the user to select the one having the intended meaning.

Keyboards that come with a fixed set of characters each printed on a key button typically require a large number of keys to accommodate a rich character set for any particular language and alphabet. Such keyboards are, by definition, inflexible. Other languages and alphabets require hardware changes, and/or data entry method changes to accommodate large character sets, e.g., as required in written Japanese or Chinese.

SUMMARY OF THE PRESENT INVENTION

It is therefore an object of the present invention to provide a flexible graphical user interface that is both flexible and able to accommodate very large, very rich character sets while only requiring a very modest numeric keypad.

It is another object of the present invention to provide a keyboard device and method for limiting character set changes for rich character sets to software changes only.

Briefly, a graphical user interface embodiment of the present invention includes a processor connected to a display screen to generate a screen display of individual characters in groups together with the selector indication. Such characters typically belong in a language set, e.g., English, Japanese, Greek, etc. The processor receives from the numeric keypad a user selection of a number "1–9" that is associated with a particular one of the individual characters in a group highlighted by the selector indication. An index-and-fetch mechanism, typically implemented as a computer program sub-routine, provides for an indexed fetch of a digital data representation in a font memory of a character indexed according to the number "1–9", The fetched digital data is then available for more general use by a larger computer system, for example in the form of an "ASCII" output character.

An advantage of the present invention is that a graphical user interface is provided that provides a rich character set and selection from a numeric keypad.

Another advantage of the present invention is that a keyboard device and method is provided that varies only in its software components from one character set change to another for different languages.

These and other objects and advantages of the present invention will no doubt become obvious to those of ordinary skill in the art after having read the following detailed description of the preferred embodiment that is illustrated in the drawing figures.

IN THE DRAWINGS

DETAILED DESCRIPTION OF THE PREFERRED EMBODIMENT

Figure 1:
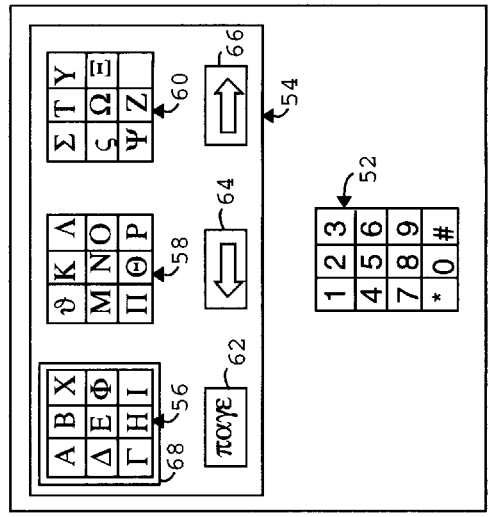
FIG. 1 is a plan view diagram of an English language graphical user interface embodiment of the present invention.

FIG. 1 illustrates a graphical user interface (GUI) embodiment of the present invention, referred to herein by the general reference numeral 10. The GUI 10 comprises a numeric keypad 12 and a display screen 14. In one embodiment, the numeric keypad 12 may resemble a TOUCH-TONE keypad used on telephone sets worldwide. The display screen 14 may be implemented with a liquid crystal display (LCD) familiar to laptop computer users or a cathode ray tube (CRT) monitor familiar to desktop personal computer (PC) users. What is presented on the display screen 14 is under computer control, and in FIG. 1 an English alphabet in Roman characters is organized into three 3×3 groups 16, 18, and 20. Each box in each group 16, 18, and 20 is "clickable", An icon 22, labeled "page" in FIG. 1, is also "clickable" and permits the user to select a whole new set of characters, e.g., the lower case letters, punctuation, arithmetic operators, numbers, etc., which replace the display groups 16, 18, and 20. A pair of left and right "clickable" icons 24 and 26 allow a user to move a selection box 28 left or right to highlight one of the display groups 16, 18, and 20.

Alternatively, three "extra" keys on the numeric keypad 12 may be used to control the position of the selection box 28 on screen, rather than using softkeys. This has the advantage of not requiring the user to move between areas on the keyboard during character entry. Although a telephone type keypad would typically have the "*", "0", and "#", keypads available for use, a more standard numeric keypad would have the ".", "±", "+", "−", and/or "0" buttons that could be used.

Assuming there is no mouse to move a cursor to a clickable box and then select it, the numbered keypads "1–9" in keypad 12 are used to indicate the user's selection of one of the corresponding boxes in the 3×3 grids of display groups 16, 18, and 20. The particular display group 16, 18, and 20 that is activated by the numbered keypads "1–9" in keypad 12 will be the one that is surrounded by the selection box 28. The "*", "0", and "#" keypads in the keypad 12 correspond, as so-called "soft-keys" do, to the "page" icon 22, the "left" icon 24, and the "right" icon 26.

Figure 2:
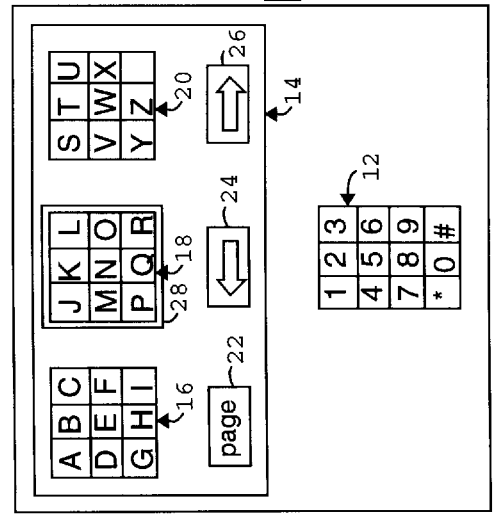
FIG. 2 is a plan view diagram of a Japanese language graphical user interface embodiment of the present invention.

FIG. 2 illustrates a graphical user interface (GUI) embodiment of the present invention, referred to herein by the general reference numeral 30. The GUI 30 comprises a numeric keypad 32 and a display screen 34. As before, the numeric keypad 32 may resemble a TOUCH-TONE keypad. The display screen 34 may be implemented with an LCD or a CRT monitor. What is presented on the display screen 34 is under computer control, and in FIG. 2 a Japanese alphabet in Hiragana characters is organized into three 3×3 groups 36, 38, and 40. Each box in each group 36, 38, and 40 is "clickable". An icon 42, labeled "つぎ, の" ("tsugi no", meaning "next") in FIG. 2, is also "clickable" and permits the user to select a next whole set of characters, e.g., the Katakana alphabet for foreign words sounded in Japanese phonetics, the Romanji character set which is the same as the English alphabet, the Kanji alphabet generally consisting of nouns written in the Chinese characters adopted in the fifth century, arithmetic operators identical to Western use, numbers, etc., which replace set-by-set the display groups 36, 38, and 40, as icon 42 is clicked. A pair of left and right "clickable" icons 44 and 46 allow a user to move a selection box 48 left or right to highlight one of the display groups 36, 38, and 40.

The numbered keypads "1–9" in keypad 32 are used to indicate the user's selection of one of the corresponding boxes in the 3×3 grids of display groups 36, 38, and 40. The particular display group 36, 38, and 40 that is activated by the numbered keypads "1–9" in keypad 32 will be the one that is surrounded by the selection box 48. The "*", "0", and "#" keypads in the keypad 32 correspond, as so-called "soft-keys" do, to the "page" icon 42, the "left" icon 44, and the "right" icon 46.

Figure 3:
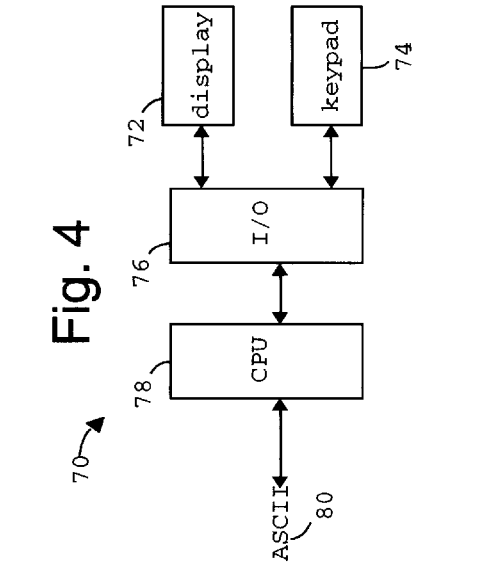
FIG. 3 is a plan view diagram of a Greek-character graphical user interface embodiment of the present invention.

FIG. 3 illustrates a Greek-letter graphical user interface (GUI) embodiment of the present invention, referred to herein by the general reference numeral 50. Such character sets are also used in written Russian. The GUI 50 comprises a numeric keypad 52 and a display screen 54. As before, the numeric keypad 52 may resemble a TOUCH-TONE keypad. The display screen 54 may be implemented with an LCD or a CRT monitor. What is presented on the display screen 54 is under computer control, and in FIG. 3 an upper-case Greek alphabet is organized into three 3×3 groups 56, 58, and 60. Each box in each group 56, 58, and 60 is "clickable", An icon 62, labeled "παγε" (page) in FIG. 3, is also "clickable" and permits the user to select a whole new set of characters, e.g., the lower-case Greek alphabet, punctuation, arithmetic operators, numbers, etc., which replace the display groups 56, 58, and 60. A pair of left and right "clickable" icons 64 and 66 allow a user to move a selection box 68 left or right to highlight one of the display groups 56, 58, and 60.

The numbered keypads "1–9" in keypad 52 are used to indicate the user's selection of one of the corresponding boxes in the 3×3 grids of display groups 56, 58, and 60. The particular display group 56, 58, and 60 that is activated by the numbered keypads "1–9" in keypad 52 will be the one that is surrounded by the selection box 68. The "*", "0", and "#" keypads in the keypad 52 correspond, as so-called "soft-keys" do, to the "page" icon 62, the "left" icon 64, and the "right" icon 66.

Figure 4:
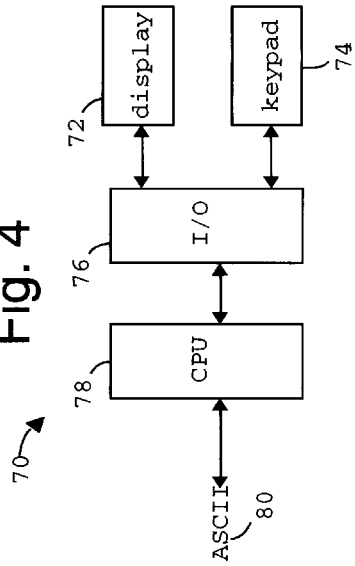
FIG. 4 is a function block diagram of a display and keypad pair, similar to those of FIGS. 1–3, connected through an input/output peripheral interface to a microcomputer.

FIG. 4 represents a soft-key keyboard embodiment of the present invention, referred to herein by the general reference numeral 70. The keyboard 70 comprises a display 72, similar to displays 14, 34, and 54 of FIGS. 1–3, and a keypad 74, similar to keypads 12, 32, and 52. The display 72 and keypad 74 are connected through an input/output (I/O) peripheral interface 76 to a microcomputer 78. This whole soft-key keyboard 70 is able to produce a variety of "ASCII" output character streams 80 for use by a personal computer or instrument that are customized for each user-preferred language and easily reprogrammed for another user who requires a different language and character set. In particular, such a scheme would be useful in a GPS navigation receiver where the graphics display is capable of a modest complexity screen display, but the number and variety of key buttons available is severely restrained.

Figure 5:
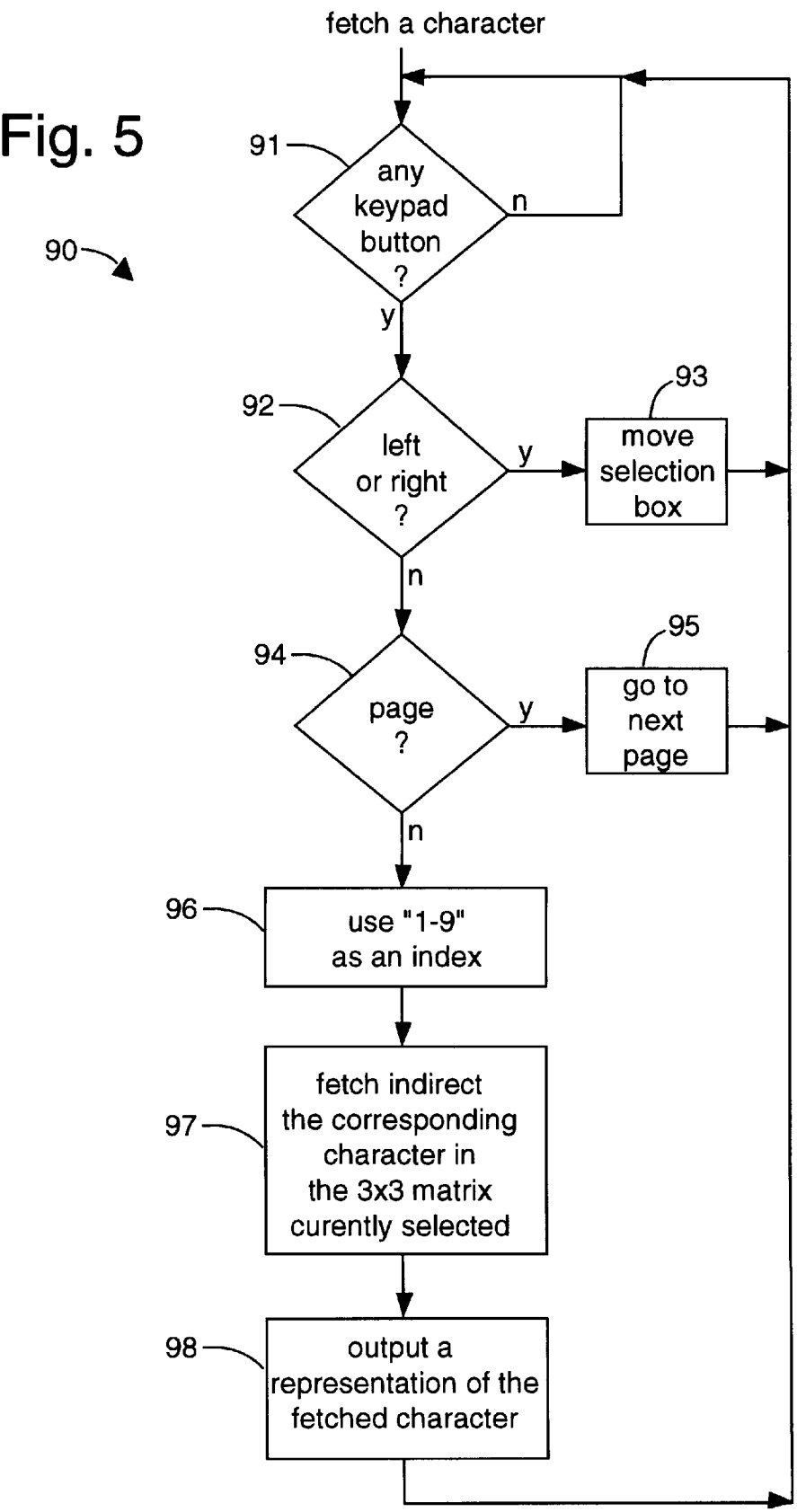
FIG. 5 is a flowchart of a computer-implemented method embodiment of the present invention.

FIG. 5 illustrates a computer-implemented method embodiment of the present invention, referred to herein by the general reference numeral 90. For example, the method 90 is executed as control program firmware in the microcomputer 78 of FIG. 4. The method 90 comprises a step 91 that looks for any button in the keypad being depressed, e.g., keypads 12, 32, 52, and 74. If none, the program wait loops. Otherwise, a step 92 looks to see if the button pressed represented left or right choices, e.g., 24 or 26, 44 or 46, and 64 or 66. If so, a step 93 moves the selection box, e.g., selection boxes 28, 48, and 68, one step left or right. Otherwise, a step 94 checks if the button pressed represented next page, e.g., 22, 42, and 62. If so, a step 95 causes a next page to be displayed, e.g., for additional character choices, or even other whole language and function choices. Otherwise, a step 96 assumes the button pressed was "1–9" and uses the symbol represented by the pressed button as an index. A step 97 fetches a character from memory, e.g., a character in a font set, according to the current 3×3 matrix selected by the selection box and the number "1–9" pressed. A step 98 interprets the character font to, e.g., serially output an "ASCII" digital serial representation of the corresponding character desired to be sent by the user.

Generally, a processor is connected to the display screen to generate a screen display of the individual characters in groups together with the selector indication. The processor receives from the numeric keypad a user selection of a number "1–9" that is associated with a particular one of the individual characters in a group highlighted by the selector indication. An index-and-fetch mechanism, typically implemented as a computer program sub-routine, provides for an indexed fetch of a digital data representation in a font memory of a character indexed according to the number "1–9", The fetched digital data is then available for more general use by a larger computer system.

Although the present invention has been described in terms of the presently preferred embodiment, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A method for generating alphabetical characters in ASCII-text streams from a numerical keypad with keypads representing "0–9", "*", and #, the method comprising the steps of:

representing every constituent character of an alphabet in corresponding spaces in a set of three side-by-side three-by-three matrices on a display screen connected to a microcomputer;

presenting a "move-left", "move-right", and "page" control button on said display screen near said set of three side-by-side three-by-three matrices;

indicating a "selection choice" for said user by highlighting on said display screen only one of said set of three side-by-side three-by-three matrices;

scanning with said microcomputer a four-by-three numerical keypad with individual keypads representing "0–9", "*", and "#" for any user depression of a keypad, wherein said "*" corresponds to said "page" control button, said "0" corresponds to said "move-left" control button, and said "*" corresponds to said "move-right" control button;

if any keypad was detected as being depressed, testing to see if such keypad represents a "move-left" or "move-right" selection choice by said user, and if so, causing said selection choice to correspondingly move left or right to highlight another one of said three side-by-side three-by-three matrices;

if any keypad was detected as being depressed, testing to see if such keypad represents a "page" selection choice by said user, and if so, causing a different alphabet to be displayed in corresponding spaces in a new set of three side-by-side three-by-three matrices on said display screen; and if any keypad was detected as being depressed, testing to see if such keypad represents a "1–9", and if so, serially outputting from said microcomputer an ASCII-text stream representing a corresponding one of nine alphabet characters displayed in a highlighted one of said three side-by-side three-by-three matrices on said display screen.

2. The method of claim 1, wherein:

the step of serially outputting includes using an index-and-fetch mechanism, implemented as a computer program sub-routine, which provides for an indexed fetch of a digital data representation in a font memory of a character indexed according to a number "1–9", and sending a fetched digital data to a larger computer system.

* * * * *